(12) United States Patent
Chiarabini et al.

(10) Patent No.: US 7,324,228 B2
(45) Date of Patent: Jan. 29, 2008

(54) SYSTEM AND METHOD FOR DOWNLOADING AND FOR PRINTING DATA FROM AN EXTERNAL CONTENT SOURCE

(75) Inventors: Luca Chiarabini, San Diego, CA (US); Xavier Boix, Sant Cugat-BCN (ES); Mark E. Boettcher, Vancouver, WA (US); Michael D. Whitmarsh, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 943 days.

(21) Appl. No.: 09/935,579

(22) Filed: Aug. 24, 2001

(65) Prior Publication Data

US 2002/0039196 A1    Apr. 4, 2002

Related U.S. Application Data

(63) Continuation-in-part of application No. 09/513,441, filed on Feb. 25, 2000, now abandoned.

(30) Foreign Application Priority Data

Aug. 25, 2000 (GB) ................... 0021063.3

(51) Int. Cl.
*G06F 3/12* (2006.01)
*G06F 15/00* (2006.01)

(52) U.S. Cl. .................... 358/1.15; 358/1.13
(58) Field of Classification Search ............ 358/1.15, 358/402, 1.13, 1.16, 1.17, 1.18, 1.14, 1.1; 705/9; 718/1, 100; 709/200
See application file for complete search history.

(56) References Cited

U.S. PATENT DOCUMENTS 5,438,436 A * 8/1995 Harris ................. 358/500
5,727,137 A * 3/1998 LeClair et al. ............ 358/1.17
6,009,153 A * 12/1999 Houghton et al. ..... 379/102.02

(Continued)

FOREIGN PATENT DOCUMENTS

| EP | 0 704 792 | 9/1995 |
|---|---|---|
| EP | 0 733 965 | 9/1996 |
| EP | 0 795 817 | 9/1997 |
| EP | 0 911 723 | 4/1999 |
| GB | 2 325 997 | 12/1998 |

OTHER PUBLICATIONS

B. Noghani et al., "Reducing Latency on the Internet using "Component-Based Download" and "File-Segment Transfer Protocol": Experimental Result", Proceedings of the Jul. 2000 Symposium on Performance Evaluation of Computer and Telecommunication Systems.*

(Continued)

*Primary Examiner*—Dov Popovici

(57) ABSTRACT

A system and method are provided for enabling faster downloading and printing of data received from an external content source. In one embodiment, the method is segmenting the data file available on a content source external to the user computing device into a plurality of portions; independently downloading to said computing device each of said plurality of portions; and assembling each downloaded portion into a second data file on said computing device, to mach such first data file. In a second embodiment the method is (a) selecting a first data file to be printed from said plurality of data files; (b) downloading said selected data file form a content source external to a computing device connected to the printer, (c) once said selected data file is entirely downloaded into said computing device, processing said selected data file and sending the processed data to the printer for printing; and (d) during said steps of processing and sending, selecting the following data file from said plurality of data files and repeating steps (b) (c) and (d) for said selected data file.

13 Claims, 6 Drawing Sheets

U.S. PATENT DOCUMENTS

| | | | |
|---|---|---|---|
| 6,025,923 A * | 2/2000 | Kageyama et al. | 358/1.14 |
| 6,031,624 A * | 2/2000 | Murphy | 358/1.17 |
| 6,238,105 B1 * | 5/2001 | Pardo | 358/1.17 |
| 6,313,921 B1 * | 11/2001 | Kadowaki | 358/1.15 |
| 6,392,758 B2 * | 5/2002 | Hines | 358/1.9 |
| 6,426,799 B1 * | 7/2002 | Okimoto et al. | 358/1.15 |
| 6,691,166 B1 * | 2/2004 | Gasior et al. | 709/232 |
| 6,775,705 B2 * | 8/2004 | Maeda | 709/230 |
| 6,982,801 B1 * | 1/2006 | Saito | 358/1.15 |

OTHER PUBLICATIONS

Tachibana Hiroaki; Patent Abstracts of Japan—JP 110127276; Nov. 21, 2000.

Chuck Forsberg; "Evolution and Selection of File Transfer Protocols"; http://www.omen.com/zmdmev.html; 7 pages.

Search Report for Corresponding Great Britain Application No. GB 0021063.3.

* cited by examiner

SYSTEM AND METHOD FOR DOWNLOADING AND FOR PRINTING DATA FROM AN EXTERNAL CONTENT SOURCE

CROSS REFERENCE TO RELATED APPLICATION(S)

This is a continuation in part application of application number Ser. No. 09/513,441 filed on Feb. 25, 2000 now abandoned which is hereby incorporated by reference herein.

This application also claims foreign priority benefits under 35 U.S.C. § 119 of Great Britain application GB 0021063.3 filed Aug. 25, 2000, which is herein incorporated by reference.

TECHNICAL FIELD

The present invention relates generally to downloading data from an external content source and, more particularly, to methods and systems that enable faster and more reliable downloading of data received from an external content source.

BACKGROUND

In any Internet application download/upload of large data files has always been a major problem. There are several weird problems related to transfer of data through Internet protocols (IP) such as HTTP or FTP. Most of these problems are related to frequent error conditions that may occur during any long download/upload process. Errors like a broken transmission, lost connection, stalled transfer and so on are very common problems for large data file transfers.

An example of a typical internet service where these problems become even worst is Print On Demand Services since very large data files (i.e. more than 10 Mb) are exchanged over the Internet.

A Print On Demand (POD) Service generally allows a customer to buy printed reproductions of certain data files, which can be available on particular web sites or on the customer's own computer. Such data files, once selected by the customer, are transferred, preferably via Internet, to a print service facility/provider for their reproduction, and often via a modem. For example Mediaflex.com (http://www.mediaflex.com) offers an Internet accessible printing service using a standard web site.

Conventional print service providers (PSPs) comprise one or a plurality of printers in a singles physical location, e.g. a print shop or a print room, which provide to a customer a printing service for posters, brochures, leaflets, copies of photographs and the like. Typically a print service provider may comprise one or more large format printers capable of printing to large format size media, i.e. a HP DesignJet printer.

Printing speed is an important feature for printers of all types, in particular for printers at print service facilities. In a POD environment if a customer desires to buy a bitmap image that fills an 8½×11 inches page at 300 dots-per-inch (dpi) in 24 bit colour, this uncompressed image file would be over 22 Mb in size. Even compressing the file using JPEG compression would still leave a file several MB in size. Then, such file is download from the server where it is stored to the print service provider for its printing. With a modem operating at 56.6 Kb/s, this download would take several minutes, If working at full speed and not experiencing any of the above error cited conditions. During this time the printer sits idle as it waits to receive data and it will not start receiving data, i.e. printing. Clearly if the downloading process, for any of the above reasons, fails, the time the printers stay idle get bigger and bigger causing frustration and damages (printers not printing the required job) to the PSP's owner.

However not only the downloading time has accrued problems, but also the rest of the traditional sequential printing process, which causes the growth of the total print time for each print to further unacceptable levels in particular for a PSP, which is trying to maximise the amount of time during which each printer is actually printing.

With reference to FIG. 1, traditionally printing of a raster data has been based on a sequence of the following tasks: "download", "load", "process", print", "I/O". For instance a 4 Mb JPEG (or TIFF, PhotoCD or the like) compressed raster file has been traditionally printed by:

downloading: take 4 Mb of compressed raster data from the internet;
loading: decompress 4 Mb data into 50 Mb memory data;
processing: apply image processing to 50 Mb memory data;
printing: send 50 Mb memory data through the print driver, eventually till the print spooler; and
I/O: send 4 Mb-100 Mb (compressed/uncompressed) data through the I/O, till the printer, which eventually starts printing.

According to FIG. 1, a PSP, by printing several images, has to repeat for each of these such sequence of tasks, which means that long period s of "printing process" time are always required. Then, there is a need, in particular for a PSP, for methods and systems which can increase the number of prints that can be produced by each printer, optimising such printing process.

Applicant realises that most of the above stated problems, occurring while downloading/uploading files from/to a server to/from a client computing device, are not likely to appear when small files (generally less than 1 Mb) are transferred.

SUMMARY OF THE INVENTION

According to a first aspect of the present invention there is provided a method to download a first data file to a computing device, comprising the steps of segmenting the data file available on a content source external to the user computing device into a plurality of portions; independently downloading to said computing device each of said plurality of portions; and assembling each downloaded portion into a second data file on said computing device, to mach such first data file.

This means that only small sized "files" (portions) are download/uploaded via the telecommunication network, and that in the few occurrences of a failed transmission, only small sized files will be re-transmitted. This also means that even if the amount of time required for the downloading of a given time is not reduced in case of a "good connection", it makes the total downloading time less dependent on the quality of the connection. In fact a bad connection may cause substantial increases of the downloading time due to the frequent need of retransmission of the same data.

In addition, reducing the occurrence of transmission interruption it reduces the risk to not receive any error message advising that the downloading ha been interrupted for any reason, generating the dangerous believe that the download ended correctly and the file is complete. For instance it may happen if the computing device is protected by a fire wall.

Preferably, the size of each portion is smaller than or equal to 1 Mb.

The split of the full size of the data file to a number of portions having a smaller size allows to enjoy a transmission through a more reliable connection for the entire data file. In fact, experiments run by the Applicant showed that a good connection (above 15 Kb/s or more preferably 20 Kb/s) over the Internet can be guaranteed for few minutes (4 to 10 min) only (this corresponding to transmission of 1 Mb or below of data), then may experience degradation or other problems.

More preferably, at least two portions of said plurality of portions have the same size.

In preferred embodiment, the method comprises a step of creating said second data file in the computing device having size equal to the size of said first data file.

The creation of the empty file is twofold: firstly it ensures before starting the download that there is enough space in, the memory store the data file; secondarily, it allows to employ a simpler method to re-assembly the independently downloaded portions of the original data file.

Typically, said step of independently downloading comprises the step of downloading X bytes of said first data file starting from byte Y of said first data file and storing the downloaded X bytes into said second data file form byte Y of said second data file.

In a further preferred embodiment, the method comprises the step of downloading at least two of said plurality of portions by simultaneous threads. Preferably, 4 or more portions are downloaded by simultaneous threads This allows to achieve the bigger reduction in the downloading time.

More preferably, a further simultaneous thread is launched for independently downloading a further portion of said plurality of portions if a data transfer speed for any of the current active thread(s) is bigger than or equal to Kb/s or more preferably bigger than 20 Kb/s.

In this way, the method it is optimising the capacity of the line, i.e. a new concurrent thread, which may further reduce the downloading time, is not launched if is going to fill up the connection. This may cause a reduction of the speed time of some or all of the currently active threads, then eventually provoking an increase in the total downloading time.

According to a second aspect of the present invention there is provided a method of printing a plurality of data files on a printer comprising the steps of. (a) selecting a first data file to be printed from said plurality of data files; (b) downloading said selected data file from a content source external to a computing device connected to the printer, (c) once said selected data file is entirely downloaded into said computing device, processing said selected data file and sending the processed data to the printer for printing; and (d) during said steps of processing and sending, selecting the following data file from said plurality of data files and repeating steps (b) (c) and (d) for said selected data This allows the system to continuously download, load, process, print and transmit raster data without overheating the system and minimising the bottleneck. Although the total print time of each image is not improved at all (if previous embodiment(s) achieving the improved downloading are not included in this embodiment) the overall printing system delivers an optimal in/out throughput ratio.

According to a third aspect of the present invention there is provided a method printing a plurality of data files on a printing device, comprising a computing unit and a printing unit, said method comprising the steps of. (a) selecting a first data file to be printed from said plurality of data files; (b) downloading said selected data file, by means of said computing unit, from a content source external to said printing device; (c) once said selected data file is entirely downloaded into said printing device, processing said selected data file and passing the processed data to the printing unit for printing; and (d) during said steps of processing and passing, selecting the following data file from said plurality of data files and repeating steps (b) (c) and (d) for said selected data file.

According to a fourth aspect of the present invention there is provided a computer program product comprising computer program means adapted to perform the method of downloading and/or printing a plurality of data files on a computing device or printing device when said program is run on the. computing device or the printing device.

According to a fifth aspect of the present invention there is provided a system comprising means adapted for carrying out all the steps of the method of downloading and/or printing a plurality of data files on a computing device or printing device.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 7 is a block diagram showing the full printing time achieved by a method of printing a plurality of data files on a printer executed in the system of FIG. 2.

DETAILED DESCRIPTION OF THE INVENTION

There will now be described by way of example the best mode contemplated by the inventors for carrying out the invention. In the following description of numerous specific details are set forth in order to provide a through understanding of the present invention. It will be apparent however, to one skilled in the art, that the present invention may be practiced without limitation to these specific details. In other instances, well known methods and structures have not been described in detail so as not to unnecessarily obscure the present invention.

Whilst the following description applies to a plurality of computing devices and printing devices, including, small and large format printers, facsimiles, all-in-one devices or the like, communicating over the internet it will be understood by the person skilled in the art, that in general such devices may communicate over any communications network, including virtual private networks (VPN's), local area networks (LAN's), mobile telecommunications networks or the like.

In this specification, the term 'communication network' includes any communications network over which a plurality of computer entities can communicate with each other by transfer of electronic data files. Such networks include both packet switched and circuit switched networks, and hybrids of packed switched/circuit switched networks. Examples of such networks include the Internet, wide area networks (WAN's). Various protocols such as internet protocol (IP); asynchronous transfer mode (ATM); wireless application protocol (WAP) and the like may be used.

Figure 2:
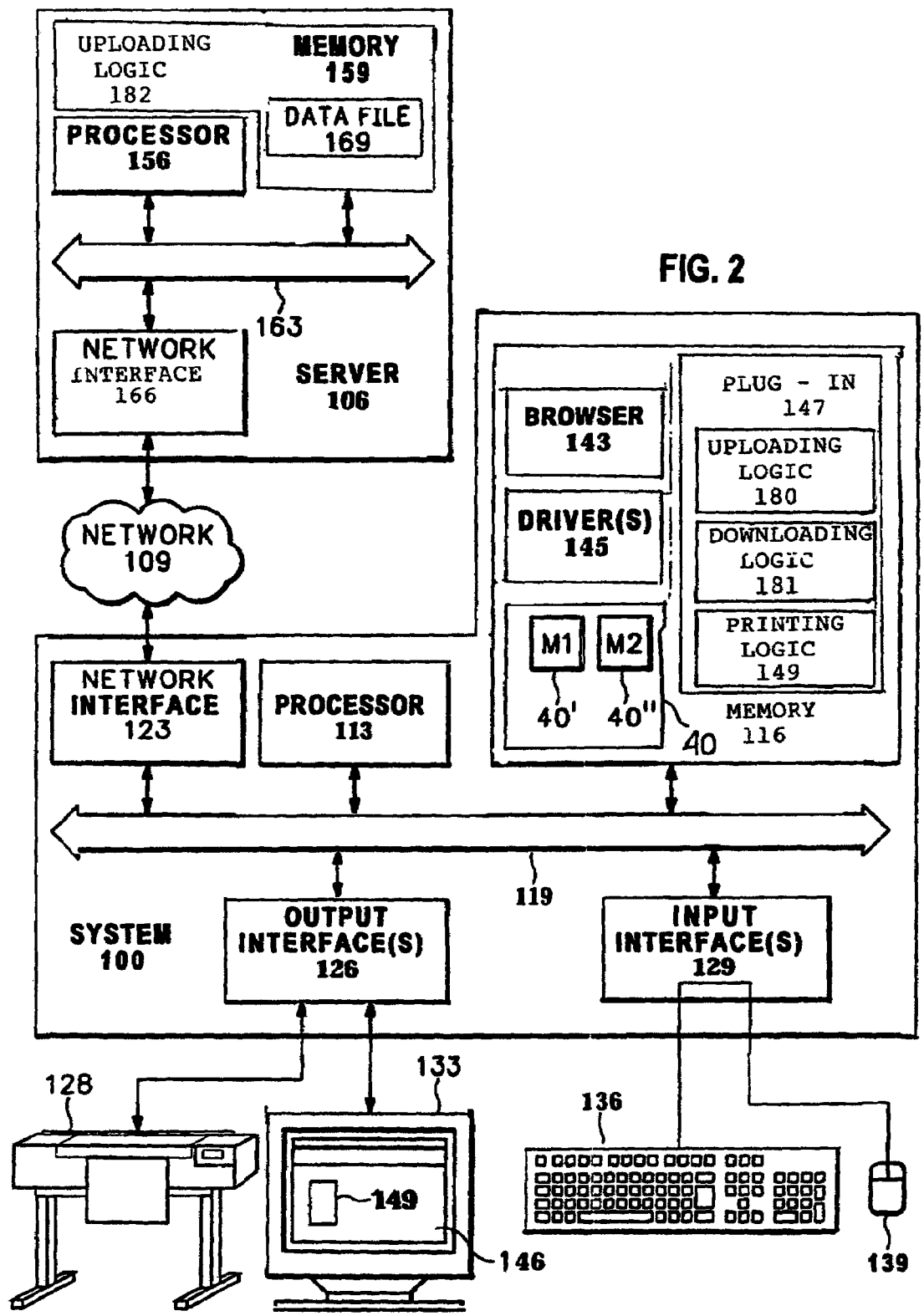
FIG. 2 is a block diagram of a system for printing a data file on a printer according to one embodiment of the present invention.

With reference to FIG. 2, a block diagram of a system 100 for printing a data file on a printer according to one embodiment of the present invention is shown. The system 100 may comprise, for example, a computer system as shown or a dedicated logical circuit that replaces the principle components of the computer system, which can be integrated into a printing device. In the preferred embodiment, the system 100 includes a processor 113 and a memory 116, both of which are electrically coupled to a local interface 119. The local interface 119 may comprise, for example, a data bus with an accompanying control bus as is known by those skilled in the computer art. The local interface 119 provides a conduit for the transfer of data between the various components attached thereto.

The system 100 of FIG. 2 is shown in context with a server 106 and a network 109. The system 100 also comprises a network interface 123 that electrically couples a network 109 to the local interface 119. The network interface 123 makes data obtained from the server 106 via the network 109 available on the local interface 119. The network interface 123 may include, for example, a modem or an appropriate network card that may be employed to transmit and receive data across the communications network 109.

The system 100 also includes one or more output interfaces 126 and one or more input interfaces 129. The output interfaces 126 electrically couple one or more output devices to the local interface 119. Examples of such output devices include a printer 128, a display device 133 and other output devices such as speakers, etc. The output interfaces 126 may include, for example, an interface card or other similar device. Likewise, the input interfaces 129 electrically couple one or more input devices to the local interface 119 as shown. The input devices may include, for example, a keyboard 136 or a mouse 139. The memory 116 may comprise any one of or a combination of a number of memory devices, including both volatile and nonvolatile memory components. Volatile components are those that do not retain data values upon loss of power. Conversely, nonvolatile components retain data upon a loss of power. These volatile and nonvolatile components may include, for example, random access memory (RAM), read-only memory (ROM), hard disk drives, floppy disk drives, compact disk drives, tape drives, and other memory components.

A browser 143 and one or more drivers 145 for communicating with the output devices are stored on the memory 116. Upon execution by the processor 113, the logic of the browser 143 generates a browser graphical user interface that appears on the display device 133. The browser 143 may be employed to display various web pages that are downloaded to the system 100 via the network 109 as known in the art. Also stored on the memory 116 is a plug-in 147 that includes printing logic 149 for controlling the system 100 to print a data file on a printer in accordance with the present invention. Plug-in 147 further includes an upload logic 180 and a download logic 181 for respectively uploading a data from the system memory 116 to the server 106 or downloading data from the server to the system memory 116. As explained in more detail below, in a first embodiment the printing logic 149 gathers data received from a remote content source and sends portions of the data to the printer 128 via the driver 145.

With continued reference to FIG. 2, the server 106 may include a processor 156 and a memory 159, both of which are electrically coupled to a local interface 163. The local interface 163 may comprise, for example, a data bus with an accompanying control bus as known in the art. The server 106 also includes a network interface 166 that electrically couples the telecommunication network 109 to the local interface 163, thereby allowing data available from the network 109 to be manipulated by the processor 156 and stored in the memory 159. Also, data from the memory 159 may be transmitted to a remote location on the network 109, such as the system 100, via the network interface 166. For example, a data file 169 stored on the memory 159 may be downloaded from the server 106 to the system 100 via the network 109 and ultimately displayed on the display device 133, stored in memory 116 for future usage, or printed on the printer 128.

The system 100 may receive a data file from a remote content source, such as the server 106, and begin printing the data from the file before the entire data file is received. In this manner, the actual printing of the data file begins soon after the print request from the user and is much less dependent upon the modem speed, network traffic and other factors.

However, in a number of case it is still necessary to wait till the data 169 is entirely downloaded before starting any printing activity.

This is true for example if the data file is:

A PDF file, since all the multipage information are stored at the end of the file, thus it is necessary to receive the entire file before the printing logic is capable of the information for each page;

A BMP or TIFF files, since the information are stored in the other way around, i.e. first the data to be printed last and last the data to be printed first. Then, it is necessary to wait that the downloading is ended to get the data which are going to be printed first and so starting the printing process; or Any file comprising special actions to be performed or effects to be applied on the data image before printing which require completion of the download process to perform the action (or apply the effect) e.g. rotating the image for printing, for instance to optimise the media usage or for fitting with the media size.

In the following with reference to FIG. 3, a preferred embodiment of the system and method of the present invention which will try to address the above problem will be described.

As shown in FIG. 2, the remote content source may comprise the server 106 and the data file may be a full-page image file 169 residing in the memory 159 of the server. A user operating the computer system 100 may view on the display device 133 a web page 146 served from server 106. The web page 146 may include a thumbnail version 149 of the full-page image file 169. If the user desires to print the complete image file 169, the user may select the thumbnail version 149 and execute a print request.

Figure 3:
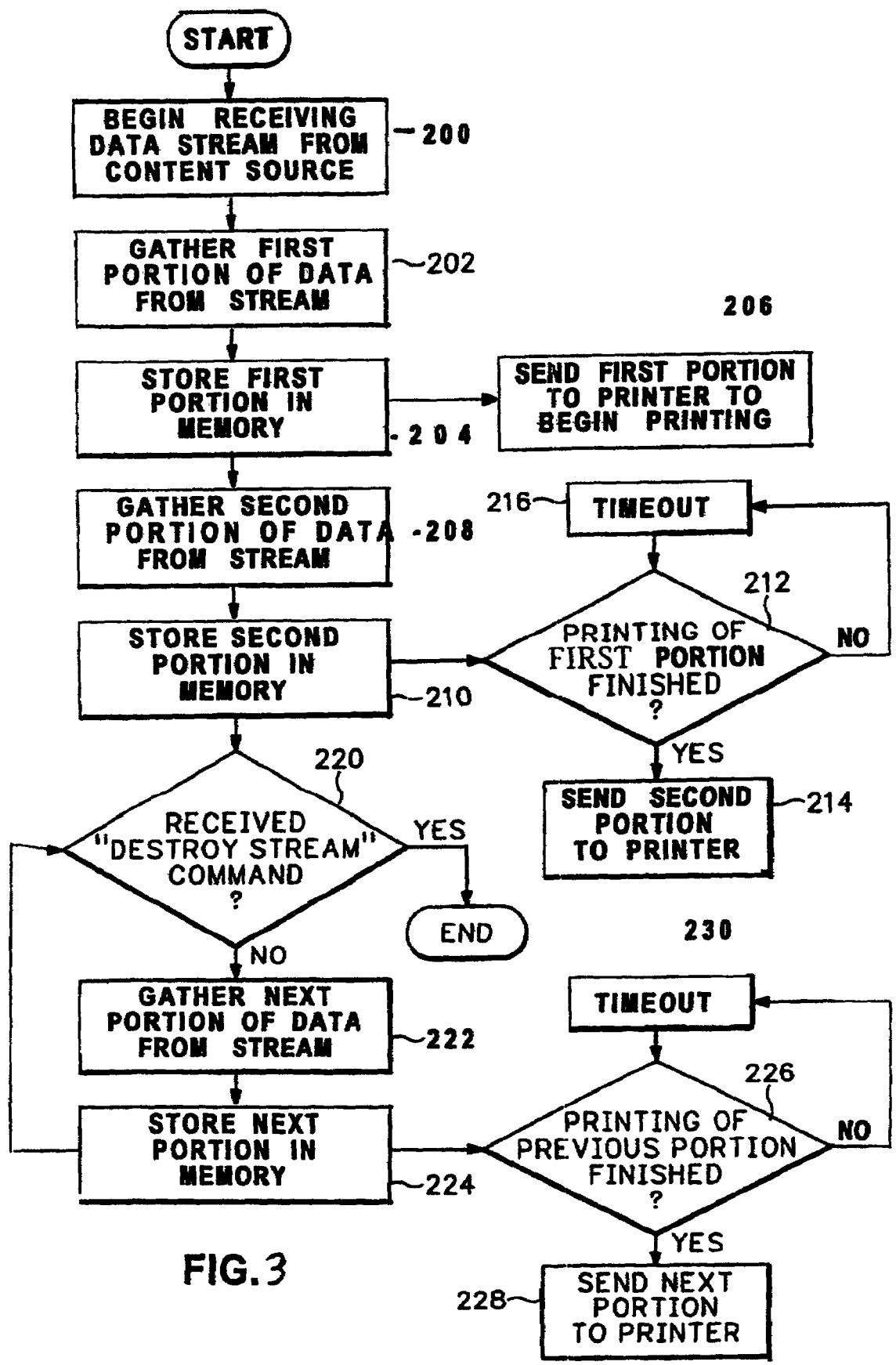
FIG. 3 is a flow chart of one embodiment of a method for printing a data file on a printer executed in the system of FIG. 2.

Turning now to FIG. 3, a flow chart of one embodiment of the system and method of the present invention is illustrated. Beginning with block 200, when the print request is executed the printing logic 149 controls the system 100 to begin receiving the image file 169 from the server 106 in the form of a data stream through the browser 143. In block 202 the printing logic 149 gathers a first portion of data 40' from the stream and stores the first portion in a temporary storage segment 40 of the memory 116 (block 204). The printing logic 149 then progresses to block 206 and sends the first portion of data 40' to the printer 128 via the driver 145. Upon receiving the first portion of data 40', the printer 128 begins printing. Meanwhile, in block 208 the printing logic 149 gathers a second portion of data 40" from the stream and stores the second portion in the memory 116 (block 210). It will be appreciated that the step of gathering a second portion of data 40" (block 208) may be performed concurrently with the step of sending the first portion of data 40' to the printer (block 206) or may be started while the first portion of data 40' is still printing. Additionally, this step and the other steps described herein are performed in the background such that the user is unaware that data is being continuously received.

After storing the second portion of data 40" in memory (block 210), the printing logic 149 then proceeds to block 212 to determine if the printer has finished printing the first portion of data 40'. If the printer has finished printing the first portion of data 40', then the printing logic 149 sends the second portion of data 40" to the printer 128 (block 214). If the printer has not finished printing the first portion of data 40', the printing logic 149 progresses to block 216 and determines whether a printing timeout has expired, where the printing timeout comprises a predefined period of time. When the printing timeout expires, the printing logic 149 again executes the query of block 212.

It will be appreciated that in this embodiment the block size of the first, second and any additional portions of data may be a predefined value or may be adjusted based upon one or more factors, such as data transfer speed between the computer system 100 and the server 106. A more detailed explanation of one embodiment of logic that adjusts the block size of the data portions is provided below.

After storing the second portion of data 40" in memory, the printing logic 149 also determines whether the entire data file 169 has been received from the server 106. More specifically, in block 220 of the illustrated embodiment the printing logic 149 determines whether a "destroy stream" command has been received. If a "destroy stream" command has been received, the printing logic 149 ends. If a "destroy stream" command has not been received, the printing logic 149 progresses to block 222 and gathers the Next portion of data from the stream. The printing logic 149 then stores the Next portion in the temporary storage segment 40 of the memory 116 (block 224). The printing logic 149 then progresses to block 226 where it determines if the printer 128 has finished printing the Previous portion of data.

If the printer has finished printing the Previous portion, then the printing logic 149 sends the Next portion of data to the printer 128 (block 228). If the printer has not finished printing the Previous portion of data, the printing logic 149 progresses to block 230 and determines whether a printing timeout has expired, where the printing timeout comprises a predefined period of time.

When the printing timeout expires, the printing logic 149 again executes the query of block 226. Additionally, after storing the Next portion of data in memory at block 224, the printing logic 149 returns to block 220 to determine if a "destroy stream" command has been received, and the subsequent steps described above are repeated as appropriate.

With reference now to FIG. 3, a flow chart of another advantageous feature of one embodiment of the printing logic 149 is illustrated. More specifically, FIG. 3 shows the steps executed by the printing logic 149 to set a block size for the portions of data gathered from the data stream. Preferably, the steps of FIG. 3 are executed before the system 100 begins receiving data from the remote content source at block 200. The steps of FIG. 3 may also be executed periodically and concurrently with the printing system described in FIG. 2. In this manner, the block size of the portions of data may be dynamically adjusted during the printing process to optimize print speed.

Figure 4:
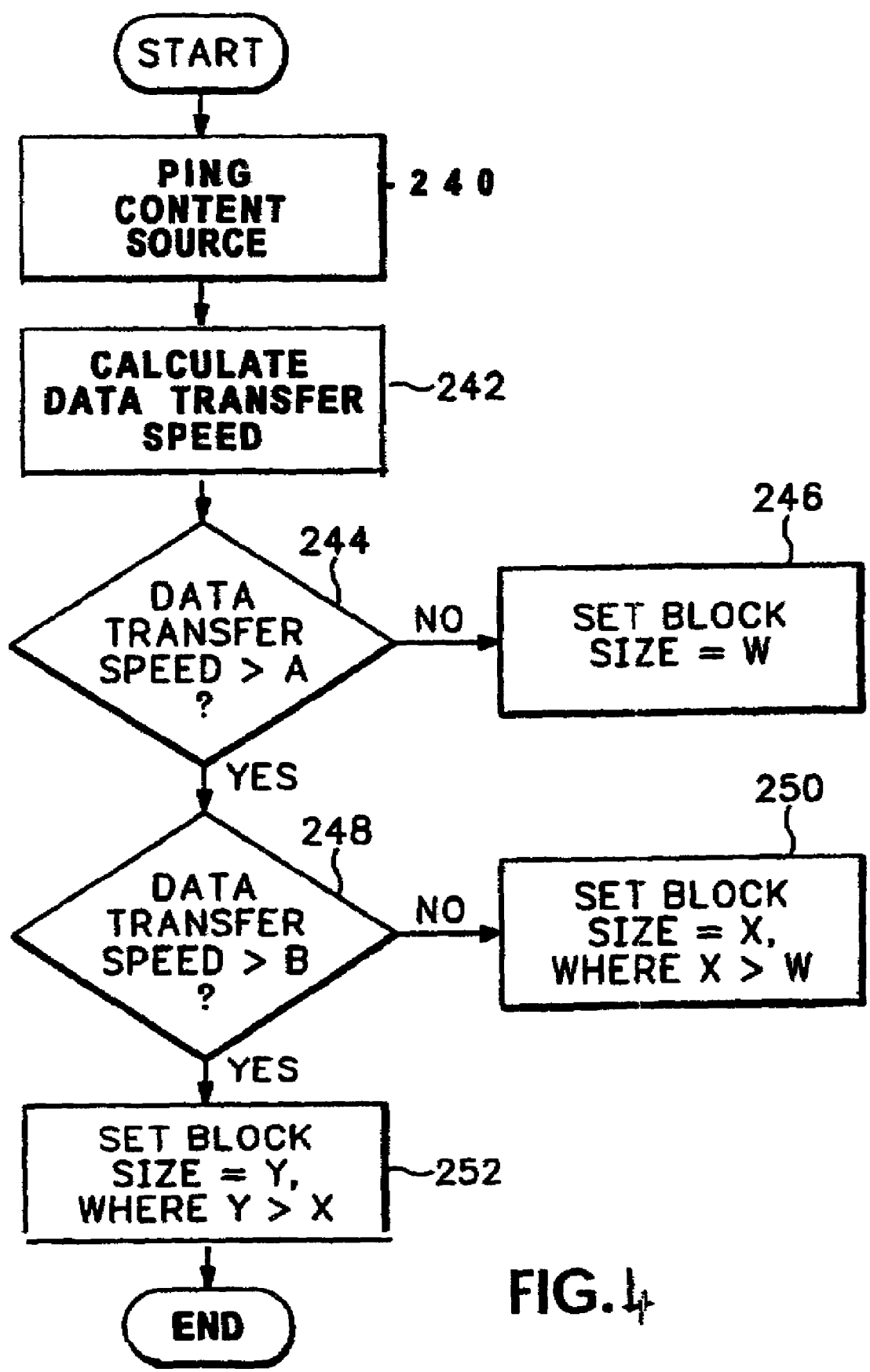
FIG. 4 is a flow chart showing the steps for setting the block size of data based on the connection speed between the content source and the user's system.

Beginning with block 240 in FIG. 4, in a further embodiment the printing logic 149 pings the server 106 and calculates a data transfer speed between the system 100 and the server (block 242). The printing logic 149 then proceeds to block 244 and determines if the data transfer speed is greater than a predetermined threshold value A, such as 28.8 Kb/s. If the data transfer speed is not greater than A, then the block size is set to a predetermined value W, such as 4 KB (block 246). If the data transfer speed is greater than A, then the printing logic 149 proceeds to block 248 where it determines if the data transfer speed is greater than another predetermined threshold value B, such as 56 Kb/s. If the data transfer speed is not greater than B, then the block size is set to another predetermined value X (block 250) such as 16 KB, where X>W. If the data transfer speed is greater than B, then the printing logic 149 proceeds to block 252 and sets the block size to another predetermined value Y, such as 64 KB, where Y>X. Thereafter, this portion of the printing logic 149 ends accordingly. Advantageously, by increasing the block size of data as the data transfer speed increases, fewer portions of data are sent to the printer. It will be appreciated that the printing logic 149 may utilize only one comparison of the data transfer rate to a single predetermined threshold value. Similarly, three or more such comparisons to different threshold values may also be utilized. It will also be appreciated that system characteristics other than data transfer speed may be examined and utilized to adjust the block size of data.

These characteristics may include printer capabilities, printer performance, processor speed, etc. Referring back to FIG. 2, and in an alternative embodiment of the system and method of the present invention, at least a portion of the printing logic 149 may reside in the memory 159 of the server 106. In this manner, one or more of the functions described in the flow charts of FIGS. 3 and 4 may be performed by the server. For example, upon receiving a request from the system 100 to download the data file 169, the server 106 may partition the data file 169 into a plurality of portions. The server 106 may then transfer a first portion of the plurality of portions of data to the system 100 via the network 109, and the system may begin printing the first portion on the printer 128. The server 106 may then transfer a second portion of the plurality of 2:5 portions of data to the system 100, and the system may print the second portion after printing the first portion. This process may continue until the entire data file 169 has been transferred to the system 100.

Figure 5:
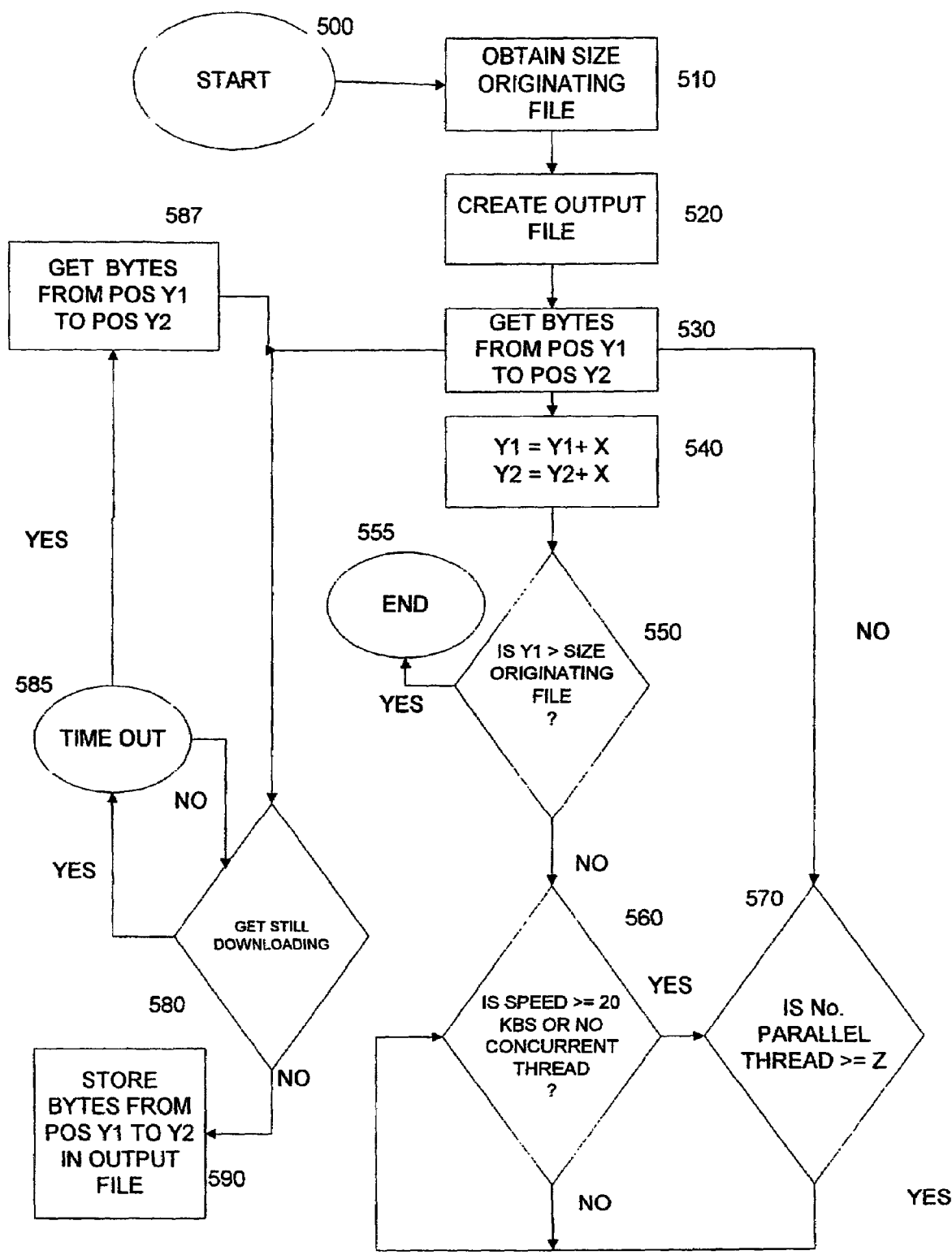
FIG. 5 is a flow chart of one embodiment of a method for downloading a data file on a printer executed in the system of FIG. 2.

Turning now to FIG. 5, a preferred system and method for downloading a data file from will be described. At step 500 it starts the process for downloading data file 169, e.g. a big image file of some Mb of size, from server 106 to system 100 via the communication network 109. At step 510, downloading logic 181 gets from server 106 the size of the data file 169 to be downloaded. At step 520 downloading logic is creating in memory 116 an empty file 40 having size equal to the size of the data file 169. The creation of the empty file 40 is twofold: firstly it ensures before starting the download that there is enough space in memory 116 to store data file 169. State of the art systems allows a download process to start and go on without checking if it will fit in the hard disk, aborting the operation (often after several minutes and after several Mb of the file has been transferred) only when storing the last block received causes an error due to the lack of space. Secondly, it allows to employ a simpler method to re-assemble within the system 100 the independently downloaded portions 40', 40", of the original data file 169.

Then pointers Y1 and Y2, used to return respectively the starting byte and the ending byte from which the get command will start downloading a portion of a given length of the data file 169, are set to 0.

At step 530 the system 100 pulls a first thread via the network to the server 106. The thread launches a get command, in accordance to http 1.1 protocol, for X bytes of the data file starting from position Y1 to position Y2, the download of the first portion of the file is started. Preferably the value of X is not varying, except for the last download, since the data file will not be always a multiple of X. Preferably, the value of X is set to 512 Kb in case of a modem connection or to 1 Mb is case of an ISDN connection. For XDSL technologies, cable modem, T1, T3, T10 or the like connections larger portion sizes can be used.

In an alternate embodiment values Y1 and X only may be used to identify the portion to be downloaded. Also in this embodiment the amount of bytes downloaded will be generally fixed, with the above exception.

While step 530 is still in execution, control passes to step 540 where pointer Y1 is now set to the beginning of the next portion to be downloaded and Y2 to the end of such next portion, by adding to the previous value of Y1 and Y2 the X number of byte transferred by the previous thread. If Y2 is bigger than the size of the file Y2 is set to the list byte of the data file.

Test 550 is checking if any portion of the file has not been assigned to a thread by reading the value of the pointer Y1. If Y1 is not returning a valid byte of the file, i.e. Y1 is bigger than the size of the file, the process end at step 550.

In the negative, control passes to a new test 560, which is checking if any of the currently active threads, each downloading a independent portions of the file, has a downloading speed bigger than or equal to 20 Kb/s or no thread are currently active. If not the test is repeated until an adequate speed is found or there are no threads currently pulled. If the speed is good, it means that the connection is not saturated yet, so that it is possible to pull an additional thread. At step 570 it is checked if the number of currently concurrent threads is above a given threshold Z, which is preferably comprised between 4 and 8, so that line is not overloaded. In fact, this may cause a degradation in the speed and in the quality of transmission of all the concurrent threads. More preferably lines at 128 Kb/s have Z set to 8, while lines at lower speed have Z equal to 4.

If the result of test 570 is no, a step 530 a new thread is pulled. In the affirmative steps 560 and 570 are then repeated until the number of concurrent threads returns below the threshold and the transmission speed is maintained above an acceptable level.

Once a thread is pulled at step 530, test 580 is checking when the downloading process ends for a given portion of the file. A timeout 585 associated to the test, interrupt the download if not completed after a given time. Then at step 587, the interrupted download, it is started again, by pulling a new thread for another attempt of downloading such portion.

Alternatively it can be divided the estimated bandwidth of the connection between server 106 and the system 100 among the number of active threads to obtain the value of a virtual connection speed for each thread. Each of the threads, which is below a minimum threshold, e.g. 20% less than such virtual connection speed, is then killed and another thread is pulled to download such portion. In case that the current average speed of the active threads is above a maximum threshold, e.g. 20% more than such virtual connection speed, no other threads are pulled.

If test 580 return no, i.e. the download of a given portion M1 is completed, at step 590, system 100 stores the portion in the empty file 40 at the positions 40' corresponding to its Y1 and Y2 values.

The same process is the repeated for portion M2 stored in the empty file 40 at position 40" and so on until all the portion of the data file 169 are stored in the once empty file 40 in memory 116.

An entirely similar process will be used by the system uploading logic 180 and the server uploading logic 182, to upload a data file from system 100 via the network 109 to memory 159 of server 106. It this case, system 100 will cause the server to create an empty file in memory 159 as big as the data file to be up load. Subsequently, using a method similar to the one described with reference to FIG. 5, system 100 pull a launches a plurality threads, each launching corresponding "post" command, according to http 1.1 protocol. Each post command contains a portion of the data file to upload. The header of each portion is containing the Y1 and Y2 values necessary to the server uploading logic 182 to re-compose the data file in the server 106. Basically FIG. 6 can be adapted to describe the uploading logic mechanism by replacing the occurrences of (i) the "get" command by the "post" command and (ii) downloading by uploading. Again, as per the download of the data file, the system 100, by means of the uploading logic 180, will manage the transmission of the portions between the system 100 and the server 106.

Figure 6:
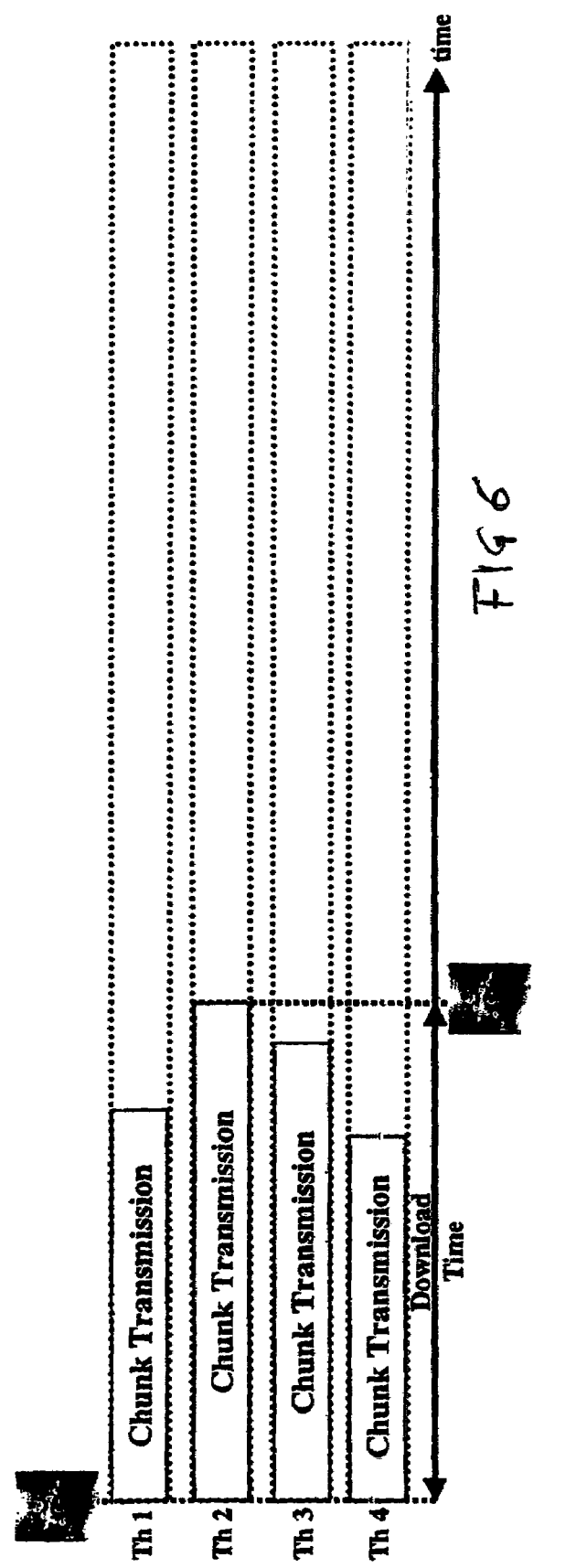
FIG. 6 is a block diagram showing the downloading time when the method of FIG. 5 is applied.

Referring now to FIG. 6, it is be graphically shown how the total download time for a data file has been dramatically reduced by the preferred embodiment(s) of the present invention.

Figure 1:
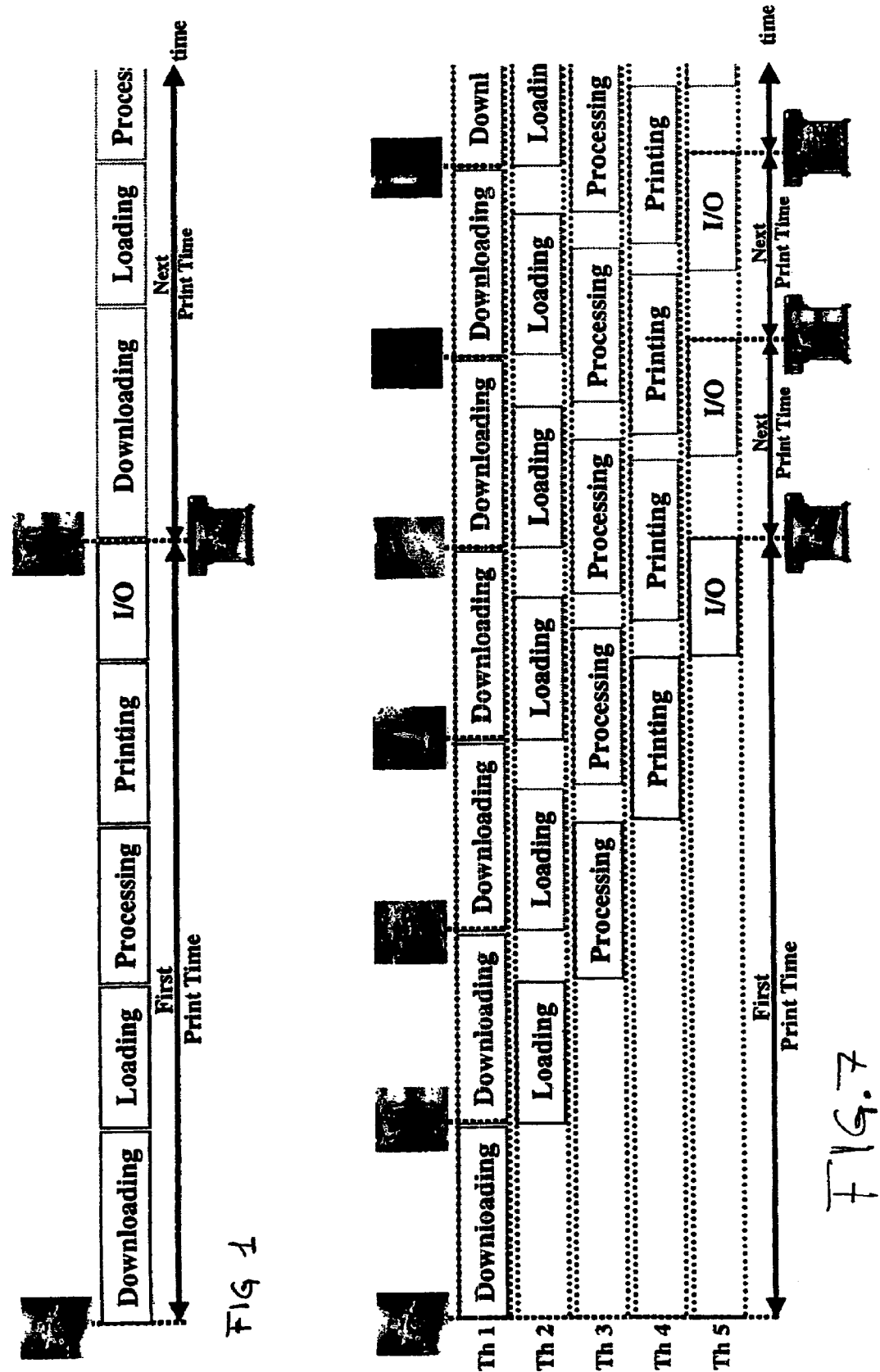
FIG. 1 illustrates steps performed by a conventional print service provider.

Referring now to FIG. 7, it is shown how, once that the downloading process has been optimised, further improvements may come by using single specialised tasks that that run separately and independently from the others, eliminating bottlenecks in the overall printing system. While one image is being downloaded a completely different image is being loaded in memory, a different one is being processed, a further different one is being printed through the print driver and yet a different one is being transferred through the I/O. Improvements achieved by this embodiment over the traditional approach (see FIG. 1) are exceptional, especially for high volume print on demand production systems, where throughput is critical. This allows the system to continuously download, load, process, print and transmit raster data without overheating the system and minimising the bottleneck. Although the total print time of each image is not improved at all (if previous embodiment(s) achieving the improved downloading are not included in this embodiment) the overall printing system delivers an optimal in/out throughput ratio.

In a further preferred embodiment, not shown, tasks the sequence of tasks download, load, process print and transfer, can be entirely or more preferably streamed, i.e. once that a chunk of the image has been processed by one task the result is immediately passed to the following task without waiting for the end of the entire task. in one embodiment the load and the I/O tasks always start respectively once the previous download and print tasks are completed. However process and print tasks can start as soon as a chunk of data has been processed respectively by the load task and by the process task.

The printing logic 149, uploading logic 180 and downloading logic 181 of the present invention may be implemented in hardware, software, firmware, or a combination thereof. In the preferred embodiment(s), the printing logic 149, uploading logic 180 and downloading logic 182 are implemented in software or firmware that is stored in a memory and that is executed by a suitable instruction execution system. If implemented in hardware, as in an alternative embodiment, such logics 149, 180, 181 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc. The flow charts of FIGS. 3, 4 and 5 show the architecture, functionality, and operation of possible implementations of the logics 149, 180, 181. In this regard, each block represents a module, segment, or portion of code, which comprises one or more executable instructions for implementing the specified logical function(s). Note that in some alternative implementations, like functions contained in the blocks may occur out of the order noted in FIGS. 3, 4 and 5. For example, two blocks shown in succession in FIGS. 3, 4 and 5 may in fact be executed substantially concurrently or the blocks may sometimes be executed in the reverse order, depending upon the functionality involved. The logics 149, 180, 181, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer readable medium can be, but is not limited to, an electronic, magnetic, optical, electromagnetic, infrared or semiconductor system, apparatus, device or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical) and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The invention claimed is:

1. A computer-implemented method comprising:
on a first thread, downloading first and second compressed pieces of data for first and second images, the first and second compressed pieces of data received from an external source over a communication network;
on a second thread, decompressing the first and second compressed pieces of data to provide first and second pieces of memory data;
on a third thread, applying image processing to the first and second pieces of memory data to provide first and second processed pieces of memory data;
on a fourth thread, sending the first and second processed pieces of memory data through a print driver to a print spooler to provide first and second pieces of print-ready data; and
on a fifth thread, transferring the first and second pieces of print-ready data through an input/output to a printer effective to enable the printer to print the first and second images,
wherein the acts of downloading the first compressed piece of data on the first thread, decompressing the first compressed piece of data on the second thread, applying image processing to the first piece of memory data on the third thread, sending the first processed piece of memory data on the fourth thread, and transferring the first piece of print-ready data on the fifth thread are performed in the given order,
wherein one or more of the acts of downloading the second compressed piece of data on the first thread, decompressing the second compressed piece of data on the second thread, applying image processing to the second piece of memory data on the third thread, and sending the second processed piece of memory data on the fourth thread are performed in parallel with one or more of the acts of decompressing the first compressed piece of data on the second thread, applying image processing to the first piece of memory data on the third thread, sending the first processed piece of memory data on the fourth thread, and transferring the first piece of print-ready data on the fifth thread, and
wherein the act of downloading is responsive to a user request to print the images and the acts of decompressing, applying, sending, and transferring are performed without further request from the user or another user.

2. The method of claim 1, wherein the compressed pieces of data comprise raster data.

3. The method of claim 1, wherein the communication network comprises a global internet.

4. The method of claim 1, wherein the first and second images each comprise a page of a document.

5. The method of claim 1, wherein the acts of downloading the second compressed piece of data on the first thread, decompressing the second compressed piece of data on the second thread, applying image processing to the second piece of memory data on the third thread, sending the second processed piece of memory data on the fourth thread, and transferring the second piece of print-ready data on the fifth thread are performed in the given order.

6. The method of claim 1, wherein the act of decompressing the first compressed piece of data on the second thread is performed immediately after completion of downloading of the first compressed piece of data on the first thread.

7. The method of claim 1, wherein the act of downloading the first and second compressed pieces of data on the first thread downloads the second compressed piece of data immediately after downloading the first compressed piece of data.

8. A computer-implemented method comprising:
on a first thread, downloading first and second compressed pieces of data for first and second images, the first and second compressed pieces of data received from an external source over a communication network;
on a second thread, decompressing the first and second compressed pieces of data to provide first and second pieces of memory data;
on a third thread, applying image processing to the first and second pieces of memory data to provide first and second processed pieces of memory data;
on a fourth thread, sending the first and second processed pieces of memory data though a print driver to a print spooler to provide first and second pieces of print-ready data; and
on a fifth thread, transferring the first and second pieces of print-ready data though an input/output to a printer effective to enable the printer to print the first and second images,
wherein the acts of downloading the first compressed piece of data on the first thread, decompressing the first compressed piece of data on the second thread, applying image processing to the first piece of memory data on the third thread, sending the first processed piece of memory data on the fourth thread, and transferring the first piece of print-ready data on the fifth thread are performed in the given order, and
wherein the acts of downloading, decompressing, applying, sending, and transferring are performed five times, once for each of the first, the second, a third, a fourth, and a fifth images, and the act of downloading a fifth compressed piece of data for the fifth image is performed concurrently with decompressing a fourth compressed piece of data for the fourth image, applying image processing to a third piece of memory data for the third image, sending the second processed piece of memory data for the second image, and transferring the first processed piece of memory data for the first image.

9. A computer-implemented method comprising:
downloading compressed pieces of data for images, the compressed pieces of data received from an external source over a communication network;
decompressing the compressed pieces of data to provide pieces of memory data;
applying image processing to the pieces of memory data to provide processed pieces of memory data;
sending the processed pieces of memory data through a print driver to a print spooler to provide pieces of print-ready data; and
transferring the pieces of print-ready data though an input/output to a printer effective to enable the printer to print the images,
wherein the acts of downloading, decompressing, applying, sending, and transferring are performed in the given order and on multiple separate threads of a single processor for at least one of the images, wherein thee of more of these acts are performed concurrently for different images, and
wherein the acts of downloading, decompressing, applying, sending, and transferring are performed five times, once for each of a first, second, third, fourth, and fifth images, and the act of downloading a compressed piece of data for the fifth image is performed concurrently with decompressing a compressed piece of data for the fourth image, applying image processing to a piece of memory data for the third image, sending a processed piece of memory data for the second image, and transferring a processed piece of memory data for the first image.

10. A computer-implemented method comprising:
downloading compressed pieces of data for images, the compressed pieces of data received from an external source over a communication network;
decompressing the compressed pieces of data to provide pieces of memory data;
applying image processing to the pieces of memory data to provide processed pieces of memory data;
sending the processed pieces of memory data through a print driver to a print spooler to provide pieces of print-ready data; and
transferring the pieces of print-ready data through an input/output to a printer effective to enable the printer to print the images,
wherein the acts of downloading, decompressing, applying, sending, and transferring are performed in the given order and on multiple separate threads of a single processor for at least one of the images, wherein all five of these acts are performed concurrently for different images, and wherein the acts of decompressing, applying, sending, and transferring are performed automatically responsive to completion of the prior act in the given order for the same piece of data.

11. The method of claim 10, wherein the compressed pieces of data comprise raster data.

12. The method of claim 10, wherein the communication network comprises a global internet.

13. The method of claim 10, wherein one or more of the images comprise a page of a document.

* * * * *

UNITED STATES PATENT AND TRADEMARK OFFICE
CERTIFICATE OF CORRECTION

PATENT NO. : 7,324,228 B2 Page 1 of 1
APPLICATION NO. : 09/935579
DATED : January 29, 2008
INVENTOR(S) : Luca Chiarabini et al.

It is certified that error appears in the above-identified patent and that said Letters Patent is hereby corrected as shown below:

On the face page, in field (57), under "Abstract", in column 2, line 9, delete "mach" and insert -- match --, therefor.

On the face page, in field (57), under "Abstract", in column 2, line 12, delete "form" and insert -- from --, therefor.

In column 13, line 19, in Claim 8, delete "though" and insert -- through --, therefor.

In column 13, line 23, in Claim 8, delete "though" and insert -- through --, therefor.

In column 14, line 1, in Claim 9, delete "though" and insert -- through --, therefor.

In column 14, line 7, in Claim 9, delete "thee" and insert -- three --, therefor.

In column 14, line 8, in Claim 9, delete "of more" and insert -- or more --, therefor.

Signed and Sealed this

Nineteenth Day of August, 2008

JON W. DUDAS
*Director of the United States Patent and Trademark Office*